R. P. PRENDERGAST.
TRUNK TIE.
APPLICATION FILED JUNE 15, 1912.
1,098,526.
Patented June 2, 1914.
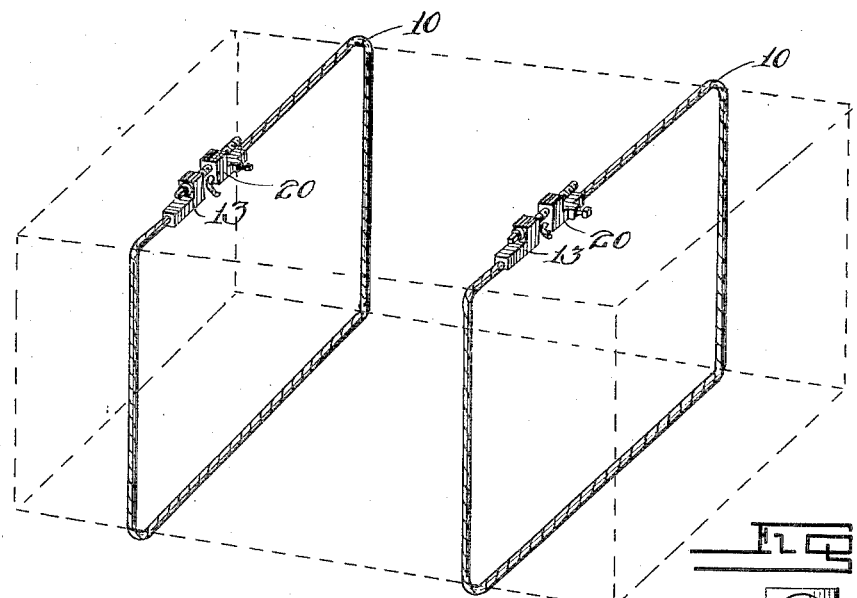
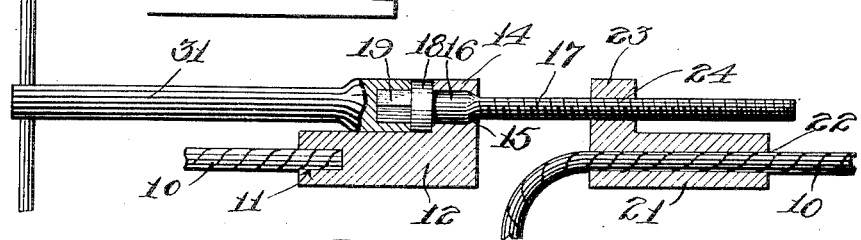
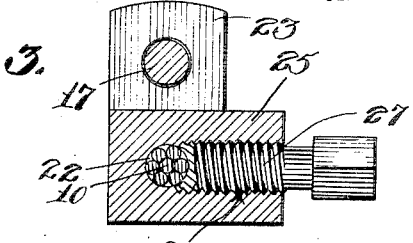
WITNESSES
Howard H. Costello.
Wade Koontz.
INVENTOR
Richard P. Prendergast
By E. E. Vrooman, his Attorney

UNITED STATES PATENT OFFICE.

RICHARD P. PRENDERGAST, OF MARSHFIELD, OREGON.

TRUNK-TIE.

1,098,526. Specification of Letters Patent. Patented June 2, 1914.

Application filed June 15, 1912. Serial No. 703,929.

*To all whom it may concern:*

Be it known that I, RICHARD P. PRENDERGAST, citizen of the United States, residing at Marshfield, in the county of Coos and State of Oregon, have invented certain new and useful Improvements in Trunk-Ties, of which the following is a specification, reference being had therein to the accompanying drawing.

This invention relates to trunk ties and has for its object the construction of an improved device to tighten the tie about the trunk.

Another object of this invention is to provide an improved means for holding the adjustable bearing of the tie in a firm position.

With these and other objects in view this invention consists in certain novel combinations, constructions, and arrangement of parts as will be hereinafter fully described and claimed.

In the accompanying drawings:—Figure 1 is a perspective view of the improved device shown encircling a box or trunk. Fig. 2 is a section taken through the improved tightening means. Fig. 3 is an enlarged cross section through the adjustable bearing. Fig. 4 is a bottom plan view of the improved set screw.

Referring to the parts by numerals 10 is a cable intended to surround or encircle a box or trunk. One end of the cable 10 is rigidly held in a socket 11, which is formed in the body portion 12 of the bearing 13. This bearing has an upstanding arm 14 provided with an unthreaded opening 15. This unthreaded opening 15 is adapted to receive the enlarged shoulder 16 of the adjusting screw 17. The adjusting screw 17 is also provided with a collar 18 to limit the movement of the enlarged shoulder 16 in the opening 14, and has at one end a rectangular head 19 by which it is rotated.

Slidably connected to the opposite end of the cable 10 is a bearing 20. This bearing has a body portion 21 through which is provided an opening 22, through which the cable passes. This bearing is provided with an upstanding shoulder 23, through which the threaded opening 24 is formed. This threaded opening 24 is adapted to receive the threaded shank of the adjusting screw 17.

Formed on one side of the slidably mounted bearing 20 is an arm 25 provided with a threaded opening 26. This threaded opening 26 communicates with the opening 22 through which the free end of the cable 10 passes. A set screw 27 is adapted to be threaded through the threaded opening 26, said set screw having at one end a concave center 28 and a beveled edge portion 29 to form a cutting edge 30. With this construction of the set screw, the cable is held firmly by means of the biting edge of the screw, thus eliminating all danger of the loose end of the cable from working loose.

When in operation the cable is drawn about the trunk and the adjusting screw 17 is passed through the opening 15 and partly threaded through the opening 24 thus connecting the two bearings 13 and 20. The free end of the cable 10 is then passed through the opening 22 in the slidably connected bearing 20, and the set screw 27 is then threaded in the opening 26 and brought against the cable 10. Thus the set screw 27 with its cutting edge 30 firmly holds the free end of the cable 10. The rectangular head 19 is then engaged by the key 31, said key 31 rotating the adjusting screw 17 thereby bringing the bearings 13 and 20 close together and tightening the cable 10 about the trunk.

Having thus described the invention what is claimed as new, is:—

A trunk tie comprising a slidable bearing, said bearing comprising a body having a centrally arranged longitudinal opening for receiving a cable, said bearing capable of free sliding movement upon a cable, a shoulder formed upon the upper side of said body and provided with a threaded aperture positioned directly above the longitudinal opening in said body, said threaded aperture adapted to receive an adjusting screw of another bearing whereby the bearings can be drawn together for tightening a cable, the adjusting screw fitting in said threaded aperture of said shoulder being positioned directly above the cable in said longitudinal opening thereby giving a direct pull upon the cable, and an arm integrally formed upon the side of said body provided with a threaded opening communicating with said longitudinal opening adapted to receive a set screw for engaging a cable in said longitudinal opening whereby said sliding bearing will be fixedly secured upon the cable, said threaded opening of said arm being comparatively long for providing an efficient gripping portion for a set screw thereby preventing a screw from becoming loose.

In testimony whereof I hereunto affix my signature in presence of two witnesses.

RICHARD P. PRENDERGAST.

Witnesses:
 JOEL A. REESE,
 MILES W. BARBER.